March 2, 1971 — H. FLEISSNER — 3,566,629
APPARATUS FOR THE TREATMENT OF PERMEABLE MATERIAL
Filed Feb. 10, 1969 — 2 Sheets-Sheet 1
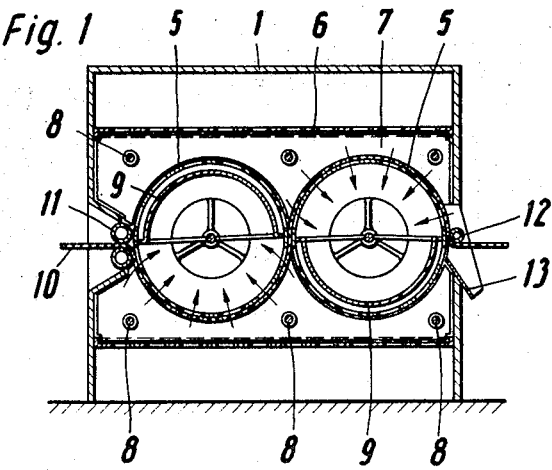
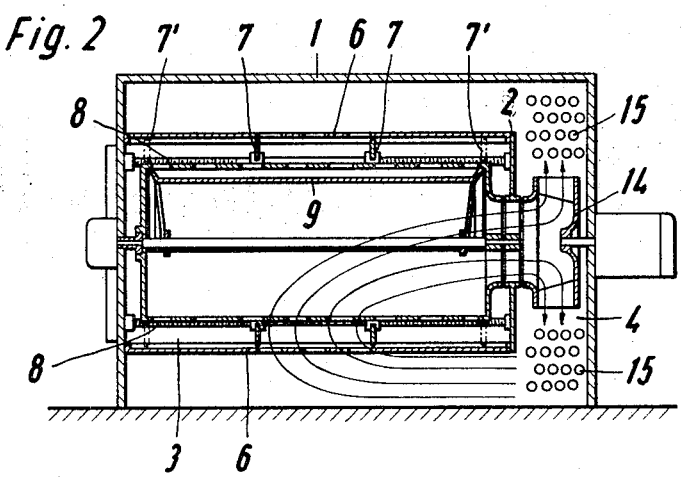
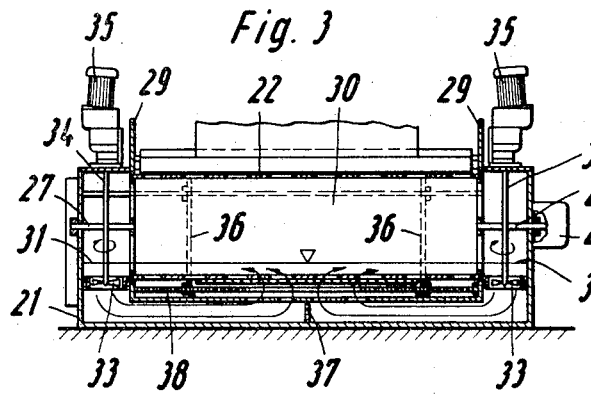
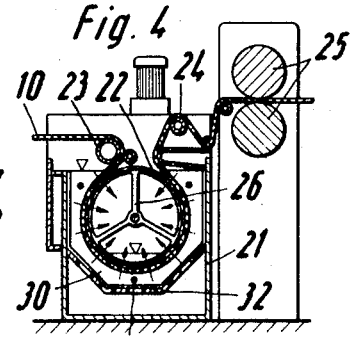
Inventor:
HEINZ FLEISSNER
By: Craig, Antonelli, Stewart & Hill
Attorney

United States Patent Office 3,566,629
Patented Mar. 2, 1971

3,566,629
APPARATUS FOR THE TREATMENT OF PERMEABLE MATERIAL
Heinz Fleissner, Egelsbach, near Frankfurt am Main, Germany, assignor to Vepa AG, Basel, Switzerland
Filed Feb. 10, 1969, Ser. No. 798,073
Claims priority, application Germany, Jan. 7, 1969, P 19 00 496.7; Feb. 10, 1968, P 17 10 480.2
Int. Cl. D06c *1/06;* D06f *17/02*
U.S. Cl. 68—158     13 Claims

ABSTRACT OF THE DISCLOSURE

The present disclosure is directed to an apparatus for treating textile materials with a treatment medium wherein the surface of the conveying means can be adapted to efficiently treat different widths of said textile materials. The present apparatus is effective for both liquid and gas treatment mediums.

BACKGROUND OF THE INVENTION

The present invention relates to an apparatus for the treatment of permeable materials, particularly textile materials, comprising a container or a housing in which at least one sieve roller is arranged and a pumping device or a blower device which circulates a vaporous, gaseous or liquid treatment medium. Advantageously, the treatment medium flows through the sieve roller preferably from the outside to the inside thereof and a baffle means may be associated with the sieve roller to prevent the passage of the treatment medium at that portion of the roller which is not covered with the material being treated. For equalizing the flow conditions, at least one sieve sheet or a stationary cylindrical member is correlated to the sieve roller. More particularly, the present invention is directed to adapting the surface of the roller conveying means for treating textile materials of varying widths.

Apparatus with one or several rollers subjected to a suction draft are well known. Such devices are used for washing, rinsing, drying and steaming, for heat-setting and thermosoling, as well as for other treatment processes. In general, textile material is conveyed on such devices. The textile material may be processed as loose stock, as top sliver or tow or in the form of lengths of material, that is, as woven or knitted fabrics or as a fleece. These devices produce an excellent treatment effect which is due to the fact that the treatment medium flows through the material being treated. Also, the material can be processed without any tension on such devices because the material rests on and is held to the sieve roller during the treatment, that is while being conveyed through the treatment medium. In general, the treatment medium flows through the sieve rollers from the outside to the inside thereof. This flow is, for example obtained by subjecting the sieve roller to a suction draft.

A disadvantage of these devices is that they are designed for treating materials with a certain material width. If materials of smaller width are to be handled on these devices, it is necessary to cover those portions at the sides of the sieve roller jacket which are not covered by the material being treated, with suitable fabrics, for example with tenting or with similar materials. These covers at the sides of the sieve drum prevent the treatment medium from flowing into the sieve roller at the sides of the textile material being treated. However, if many variable widths of textile material are processed, a correspondingly large number of covers containing variable widths are also required. If lateral covers at the sides of the sieve roller are not provided, this non-utilized part of the treatment medium drawn through this portion of the sieve roller decreases the pump or the fan capacity so that the apparatus works uneconomically if small material widths are handled without covers being provided at the lateral sides thereof. Also, the suction draft itself is less powerful.

Furthermore, the mounting of the covers causes extended non-use of the apparatus. Also, if corrosive treatment liquors are used, it is sometimes necessary to empty the bowl before mounting the covers in order to avoid injury to operators, for example from a lye of high concentration or a boiling liquor.

SUMMARY OF THE INVENTION

An object of the present invention is to avoid the prior art disadvantages in the treatment of permeable materials.

Another object of the present invention is to provide an improved apparatus for the treatment of textile materials containing varying widths.

A further object of the present invention is to provide an improved apparatus for treating textile materials containing different widths wherein the working width of the apparatus can be varied during its operation thereby substantially eliminating extended non-use (downtimes) of the apparatus.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved apparatus for the liquid and/or vapor treatment of textile materials may be obtained by providing a sieve member, for example a sieve sheet in close proximity with the surface of the conveying means, for example a sieve roller, only the center portion of said sieve sheet being perforated, and by arranging between the sieve roller and the sieve sheet two adjustable bottom means which are adapted to limit the flow-through area of the sieve roller. The adjustable bottom can be operated by means of threaded spindles. The adjustment can be done by hand, for example by means of a crank or by means of a servomotor. The permeable area of the sieve sheet is established in such a way that it substantially corresponds to the smallest possible working width required for treating textile materials with narrow widths. To obtain a larger working width the two adjustable bottoms are merely moved apart, and the treatment medium then flows through the center portion of the sieve sheet or sieve member, and because of the resistance of the textile material and the suction draft of the sieve roller, the treatment medium is drawn into the sieve roller over the entire working width of said roller.

In order to avoid losses due to leakages, it is suggested to provide the adjustable bottom means with seals so that the bottoms are sealed against the sieve rollers and possibly against the sieve sheet.

For devices which have several sieve rollers it is expedient to provide common adjustable bottoms for all sieve rollers, that is, the bottoms should extend over all sieve rollers. In the well known drying and steaming devices in which the material is passed alternately over several sieve rollers, sieve sheets are provided above and beneath the sieve rollers. With such a device, it is expedient to subdivide the two lateral adjustable bottoms into an upper and into a lower part. The bottoms are provided with recesses corresponding to the diameter of the sieve rollers.

The sieve member which is correlated to the sieve roller can be provided inside the sieve roller as well as outside the sieve roller. If the sieve member is arranged in the sieve roller, the suction draft is correspondingly equalized. For a device in which the sieve member is arranged in the sieve roller, it is suggested to support the sieve member on the roller drive side of a shaft which extends out of the housing and/or the container and which is connected with threaded spindles in the sieve roller for adjusting the bottom means using gear wheels. The threaded spindles should advantageously be supported in separate carriers. The carrier for the threaded spindles on the drive side of the apparatus may be mounted to a pipe which surrounds the shaft. However, it is also possible to mount the carrier for the threaded spindles to the stationary sieve member.

In the apparatus of the present invention, it is suggested to drive the sieve roller by means of a driving pinion and a gear rim on the sieve roller. Another effective design results if the sieve roller is provided with a concentrically arranged driving shaft which is designed as a hollow shaft, through which shaft the means for adjusting the bottom means and the pipe of the carrier extends.

The carrier for the threaded spindles which is arranged on the pump side of the apparatus is advantageously mounted to the sieve member subjected to a suction draft. Furthermore, it is suggested to support the sieve roller on the sieve member on the pump side. The sieve member subjected to a suction draft may be expediently mounted, for example welded, to the inner wall of the distribution box.

BRIEF DESCRIPTION OF THE DRAWINGS

The present invention will become more fully understood from the detailed description given hereinbelow and the accompanying drawings which are given by way of illustration only and thus are not limitative of the present invention and wherein:

FIG. 1 is a longitudinal section of the apparatus of the present invention for the treatment of textile material with a gaseous or vaporous treatment medium;

FIG. 2 is a cross section of the apparatus of the present invention according to FIG. 1;

FIG. 3 is a cross section of the apparatus of the present invention for the treatment of materials with a liquid treatment medium;

FIG. 4 is a longitudinal section of the apparatus of the present invention according to FIG. 3;

BRIEF DESCRIPTION OF THE PREFERRED EMBODIMENTS

Figure 5:
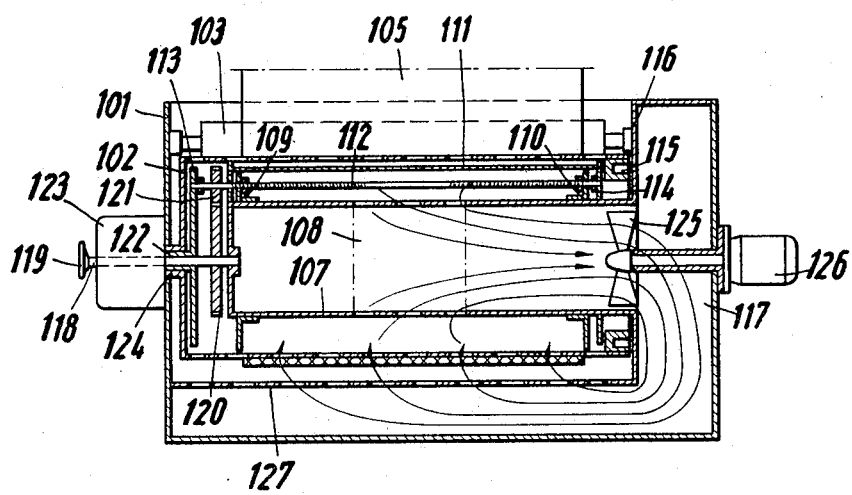
FIG. 5 is a cross section of another embodiment of the apparatus of the present invention utilizing a sieve roller subjected to a suction draft.

Referring now to the drawings wherein like reference numerals are used throughout the various views to designate like parts, the apparatus of the present invention according to FIGS. 1 and 2 comprises a heat-insulated housing 1 which is subdivided by means of a partition 2 into a treatment chamber 3 and into a fan chamber 4. In the treatment chamber 3 sieve rollers 5 subjected to a suction draft are arranged as well as sieve sheets 6 above and beneath the sieve rollers 5.

As may be readily seen from FIG. 2, the sieve sheets 6 are only perforated in their central portion. Between the sieve sheets 6 and the sieve rollers 5 adjustable bottom means 7 are disposed. Adjustment is effected by means of threaded spindles 8. The adjustable bottoms 7 are shown in FIG. 2 in the position which corresponds to the smallest possible working width. The dash-dot line in FIG. 2 shows the position which corresponds to the maximum working width. In this position the adjustable bottoms are marked with the numerals 7'. In the sieve rollers 5 at the portion which is not covered with the material being treated, baffles 9 are arranged which prevent the treatment medium from being drawn in at this portion of the sieve roller. The alternate arrangement of the baffles 9 in the sieve rollers permits an alternate guidance of textile material 10 over sieve rollers 5.

At the inlet of the apparatus a pair of rollers 11 is provided. At the discharge end of the apparatus a roller 12 and a slide 13 is arranged. In the fan chamber a fan 14 is correlated to each sieve roller 5. Above and beneath the fan 14 heater batteries 15 are provided. The fan draws the treatment medium out of the sieve rollers 5 and returns it over the heater batteries 15 to the treatment chamber 3.

The apparatus according to FIGS. 3 and 4 comprises a container 21 which is filled with a treatment liquid and in which a sieve roller 22 is disposed. Guide rollers 23 and 24 are correlated to the sieve roller 22. A textile material 10 is conveyed over the sieve roller 22 and the guide rollers 23 and 24. Subsequently, the textile material 10 is dehydrated by means of squeeze rollers 25. The sieve roller 22 consists of a jacket and spider-shaped side element 26 which is connected with axis 27. The axis 27 is mounted to the outside of the container 21. Also, a drive 28 for the sieve roller is mounted to the outside of the container 21. The container 21 is subdivided by means of partitions 29 into a central treatment zone 30 and lateral collecting compartments 31. The liquor level in the center treatment zone 30 is substantially higher than in the lateral collecting compartments 31. Thus the treatment liquor flows through the textile material due to the differential liquor level. The liquid level in the sieve roller corresponds to that in the collecting compartments 31. The liquid level outside the sieve rollers is substantially higher, as may be seen from FIG. 4. Also, in this device a sieve sheet 32 is perforated and thus permeable in its central portion only. The treatment liquor is pumped by means of pump 33 from the lateral collecting compartments 31 into the central treatment zone 30. The pump 33 is associated with a pump shaft 34 which is driven by a drive motor 35. Between the sieve sheets 32 and the sieve roller 22 adjustable bottoms 36 are again installed. Also, these adjustable bottoms are operated by means of threaded spindles 38. In order to avoid one pump from influencing the other pump and to further avoid turbulence in the center of the container, a strap 37 is provided to substantially separate the flow from said pumps. Also, with this apparatus, any desired working width between an established minimum and maximum working width can be set by adjusting the bottoms 36.

Figure 6:
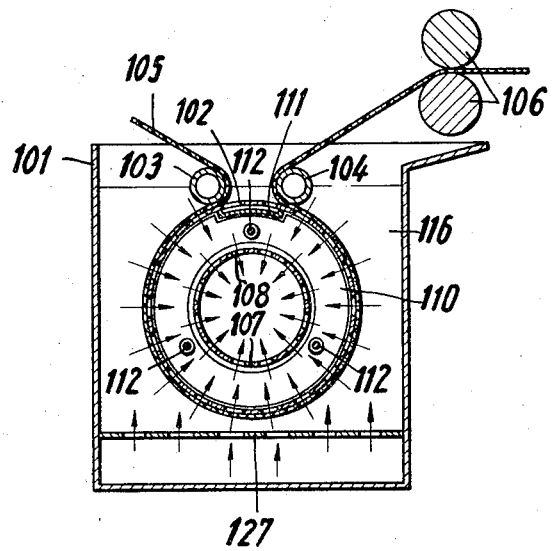
FIG. 6 is a longitudinal section of the apparatus of the present invention according to FIG. 5.

The apparatus according to FIGS. 5 and 6 comprises a container 101 which is filled with treatment liquid and in which a sieve roller 102 is arranged. To the sieve roller 102 guide rollers 103 and 104 are correlated and a material 105 to be processed is passed over these guide rollers 103 and 104 and over the sieve roller 102. Subsequently, the material is squeezed by means of squeeze rollers 106.

In the sieve roller 102 a stationary sieve member 107 with openings 108 is accommodated. On the sieve member 107 adjustable bottoms 109 and 110 are arranged, so that the suction draft of the sieve roller is effective only within the range between the two bottoms. At the side which is not covered with the material being treated (FIG. 6) a baffle 111 is mounted, said baffle extending over the entire length of the sieve roller and functioning to interrupt the suction draft at said length. For adjusting the bottoms 109 and 110, three threaded spindles 112 are provided which are supported in disk-shaped carriers 113 and 114. The carrier 114 is mounted to the sieve member 107 on which, on this side, also the sieve roller 102 is supported in a friction or roller bearing 115. The sieve member 107 is, on this side, mounted, for example screwed or welded, to an inner longitudinal partition 116 of a distribution box 117.

On the sieve roller drive side, the sieve member 107 is supported on a shaft 118. This shaft 118 extends out of the container 101 and is, at the outside, provided with a handwheel 119 or a servomotor (not shown) for the adjustment of the bottoms 109 and 110. For this purpose the shaft 118 is connected with the threaded spindles 112 via gear wheels 120 and 121. In this embodiment of the invention the carrier 113 is mounted to a pipe 122 which surrounds the shaft 118. In a gear box 123 this pipe 122 is secured against turning. Also, the driving shaft 124 of the sieve roller 102 is arranged concentrically and designed as a hollow shaft which surrounds the shaft 118 and the pipe 122. The driving shaft 124 is supported in the gear box 123.

The suction draft is produced by means of a vane-type pump 125. However, any other suitable pump may be used as well. The vane-type pump 125 and its drive 126 form one exchangeable unit. The liquid drawn in is passed into the distribution box 117 by the vane-type pump 125 and flows back into the treatment bowl through perforated intermediate bottoms 127 uniformly distributed over the whole bowl width.

If tows, fabrics, bonded nonwovens, felts and similar materials which can be subjected to lengthwise stress are processed, the liquid circuit may be reversed, that is, the liquid can be forced into the sieve roller and accordingly would flow from the inside to the outside of the sieve roller 102 whereby it would penetrate the material 105 resting on the sieve roller 102. When using several sieve rollers 102 in one container, the liquid may be drawn into one sieve roller through the roller jacket, may then be passed at the face into the other sieve roller and may flow from the inside to the outside through this sieve roller and the material resting on the sieve roller.

However, the embodiment of the invention according to FIGS. 5 and 6 is not only suitable for the treatment of materials with liquids, but it can also be advantageously used for steaming, drying and heat-setting processes, in which a gaseous and/or vaporous treatment medium is circulated in a housing and drawn and/or forced through sieve rollers which are subjected to a suction draft and/or to a positive pressure (an excess pressure produced by a blower). Also, in this case it is advantageous to arrange adjustable bottoms in association with the sieve roller so that the suction draft or the excess pressure can be effectively controlled to only that portion of the sieve roller on which the material being treated is conveyed. The internal structure and the support of the sieve roller as well as the drive for adjusting the bottoms may be designed in the same way as in the embodiment of the invention shown. Instead of a pump, an axial or radial fan is provided.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. The apparatus for the treatment of permeable materials which comprises a container means adapted to contain a treatment liquid, said container being divided into a treatment compartment and a lateral end compartment, inlet means for introducing the material to be treated to the container means, at least one sieve roller means provided with drive means rotatably disposed in the treatment compartment, the lateral end compartment communicating with both the interior of the sieve roller means and also with the conveying surface of the sieve roller, pump means disposed in the lateral end compartment, a sieve member means disposed on the inside of the sieve roller means the surface of said sieve member being permeable to the treatment liquid only at its center portion, adjustable bottom means disposed between the surfaces of the sieve roller means and the sieve member means and substantially extending to said surfaces, said bottom means being adapted to move in the axial direction of the sieve roller means to limit the zone through which the treatment medium flows through the surface of said sieve roller means, and outlet means for removing the material from the container means.

2. The apparatus of claim 1, wherein the adjustable bottom means are movable from the zone of the perforated center portion to the maximum width of the conveying surface by threaded spindle means.

3. The apparatus of claim 2, wherein the adjustable bottom means comprises two opposing surfaces which are adapted to be moved toward each other and away from each other thereby varying the effective working width of the sieve drum means by varying the zone defined between said adjustable bottom means.

4. The apparatus of claim 1, wherein the sieve member means has a cylindrical shape, the surface of said sieve member being substantially complementary with the surface of the sieve roller.

5. The apparatus of claim 1, wherein the pump means is axially disposed with respect to the sieve roller.

6. The apparatus of claim 1, wherein the inlet means and outlet means are guide rollers and wherein squeeze rollers are provided behind the outlet guide rollers.

7. The apparatus of claim 2, wherein the sieve member is supported on a shaft at the drive side of the sieve roller, said shaft extending out of the container.

8. The apparatus of claim 7, wherein the shaft is connected with the threaded spindles by gear wheels disposed in the sieve roller.

9. The apparatus of claim 8, wherein the threaded spindles connect with carrier means which are mounted to a pipe means which surrounds the shaft.

10. The apparatus of claim 1, wherein the sieve roller is driven by means of a driving pinion and a gear rim on the sieve roller.

11. The apparatus of claim 9, wherein the sieve rollers are provided with a concentrically disposed hollow driving shaft through which extends the shaft for operating the threaded spindles and the pipe which supports the carrier means.

12. The apparatus of claim 11, wherein the carrier means for the threaded spindles is mounted to the sieve member on the pump side.

13. The apparatus of claim 1, wherein the sieve roller is supported on the sieve member on the pump side of the container.

References Cited
UNITED STATES PATENTS

| | | | |
|---|---|---|---|
| 3,019,630 | 2/1962 | Fleissner et al. | 68—158 |
| 3,450,486 | 6/1969 | Fleissner | 68—5X |
| 3,494,048 | 2/1970 | Du Fresne | 34—23 |

WILLIAM I. PRICE, Primary Examiner

P. R. COE, Assistant Examiner